United States Patent [19]

Miler et al.

[11] Patent Number: 4,668,467

[45] Date of Patent: May 26, 1987

[54] SAFETY COOLING INSTALLATION FOR A WATER NUCLEAR REACTOR

[75] Inventors: Rajko Miler; Milan Guina, both of Brussels, Belgium

[73] Assignee: Westinghouse Electric Corp., Pittsburgh, Pa.

[21] Appl. No.: 623,734

[22] Filed: Jun. 22, 1984

[30] Foreign Application Priority Data

Jun. 24, 1983 [BE] Belgium .................................. 211085

[51] Int. Cl.⁴ ................................................. G21C 9/00
[52] U.S. Cl. ..................................... 376/282; 376/298; 376/299
[58] Field of Search ......................... 376/282, 298, 299

[56] References Cited

U.S. PATENT DOCUMENTS 3,859,166  1/1975  Flynn et al. ........................ 376/282
4,181,570  1/1980  Boyajian et al. ..................... 376/282

OTHER PUBLICATIONS

Milioti et al., Nuclear Technology, vol. 16, Dec. 1972, pp. 497–498.

Primary Examiner—Deborah L. Kyle
Assistant Examiner—Richard W. Wendtland
Attorney, Agent, or Firm—Daniel C. Abeles

[57] ABSTRACT

The invention concerns a safety cooling installation for the water reactor of a nuclear power station, the installation notably incorporating a reservoir for storing a cooling liquid, the said reservoir being located outside the containment which encloses the reactor circuit, the installation being provided with aspiration and discharging means arranged to aspirate the liquid from the reservoir and to discharge it into the circuit, there being provided a passive, maintenance free means to recover and conduct the liquid and containment water, the said means being arranged to recover the liquid and the water from the reactor in the lower part of the containment by non gravitational flow in the event of a break in the reactor's circuit.

9 Claims, 1 Drawing Figure

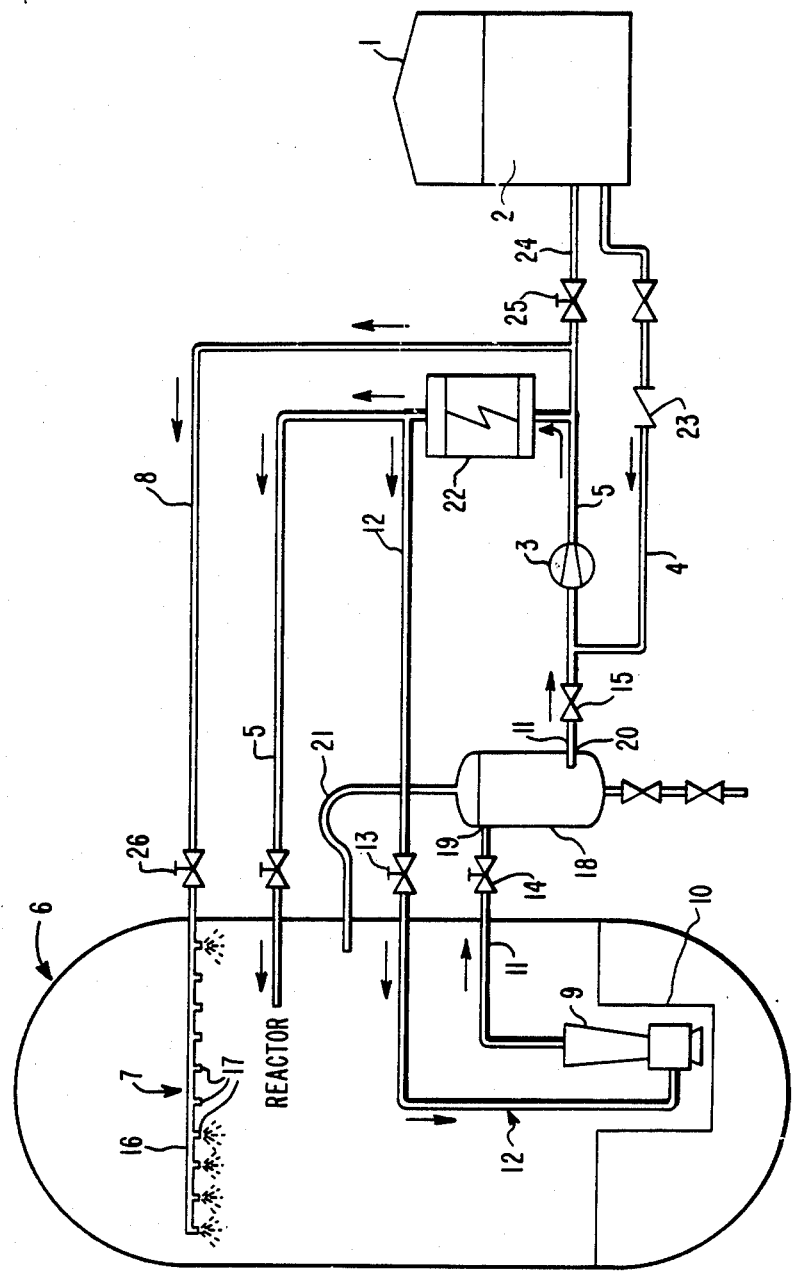

SAFETY COOLING INSTALLATION FOR A WATER NUCLEAR REACTOR

BACKGROUND OF THE INVENTION

The present invention concerns a safety cooling installation for the water reactor of nuclear power stations.

It is known that a nuclear power station should be equipped with safety or safeguarding circuits whose function is to maintain, with a high level of reliability, the power station—and, in particular, the reactor—in a safe and stable state in the event of an accident. In particular, power stations which employ water as the functional cooling fluid are equipped with circuits which make it possible, in the event the primary circuit is depressurized, to inject water under pressure in order to cool the fuel and prevent it from melting and, in the majority of cases, the stations are provided with circuits which make it possible to inject a fine spray of water into the object of this spraying being to reduce the pressure in the containment when the latter is subjected to a sudden increase in pressure subsequent to a rupture in the reactor's circuit where extremely high pressures exist, namely pressures of the order of 150 bars.

The water injected by these safeguarding circuits is furnished by one or more reservoirs generally located outside the containment enclosing the reactor circuit. In the case of a rupture of the pressure barrier of the reactor circuit, the said safety or safeguarding circuits enter into service automatically. The water injected by the safety circuits mixed with the reactor fluid flows to the lower part of the containment, called the sump. Because of the enormously high rates at which it is required to inject the water, the external reservoirs are rapidly emptied, and, because it is unacceptable to operate with an open circuit due to the large amount of radioactive contaminants in the water recovered in the sump, it is necessary to recycle this water in such a way as to keep the reactor fuel completely immersed and thus prevent it from melting.

Passage from the "injection" phase to the "recirculation" phase is generally effected automatically after a period which can vary from 20 minutes to several hours, depending on the size of the break. Safety regulations make it necessary to assume that the water located in the containment's sump is at saturation, that is, under conditions of bulk boiling at 120°–130° C. Such conditions impose very severe constraints on the selection and disposition of the pumps serving to extract the water from the containment, and also on the arrangement of the pipes connecting the sump to the said aspirating pumps. In effect, the water should not attain this state of saturation at any point in the said pipes, the consequence of such a saturation being the formation of vapor locks which would block the recirculation and hence produce cavitation and rapid destruction of the pumps.

According to present-day design, the pumps are installed in a very deep auxiliary building which is, for example, located at depths of 5 to 10 meters below the sump and in such a way as to obtain the necessary pressure for the aspiration, taking into account the load losses in the pipeline connecting the sump to the pumps. Such a design may pose difficult civil engineering problems, depending on the nature of the terrain and the seismic conditions of the site.

Another solution consists in the use of vertical pumps mounted in a cylindrical housing let directly into the structure of the auxiliary building, the length of this housing making it possible to obtain the pressure necessary for aspiration without the need for a similarly deep building.

It is evident that these designs, while being technically acceptable, are extremely costly and pose very large installation problems.

Use has also been made of special pumps which are mounted directly inside the containment's sump. These extraction pumps make it possible to provide the necessary aspiration pressure to the safeguarding pumps. These pumps, which are installed at the bottom of the sump, are actuated either by an immersed motor or by a "dry" motor located at a height sufficient for it not to be immersed. Such solutions not only require specially designed and qualified active components, that is, components requiring electrical energy in order to function and also requiring regular maintenance, but are, moreover, in contradiction with the present safety regulations which require a design which makes possible the maintenance and repair of the active equipment during the period following the accident. Such maintenance is impossible with the above arrangements, as the containment is absolutely inaccessible for a period which could be many years on account of the very high radioactivity level reigning in it.

Modifying power stations equipped with containment recirculation pump in such a way as to bring them to a state of reliability conforming to present-day regulations poses extremely complex problems and non-negligible risks, resulting in the need for digging an excavation which is large by comparison with the containment. Such a modification would also shut down production for several months, entailing, in addition, enormous financial losses.

SUMMARY OF THE INVENTION

The objects of the invention is to provide a safety installation that meets present day safety regulations by the use of means to recover and conduct water from the containment sump which, without using gravity, are totally passive and do not require maintenance nor do they require the construction of a deep auxiliary building, thus eliminating all risks of endangering the stability of existing structures, in the case of an old power station, and greatly simplifying the civil engineering, in the case of a new power station and also eliminating the possibility of a non controlled contamination of ground water by having no containment penetration below maximum spillage water level.

To this end, in accordance with the invention, the installation incorporates a reservoir for storing a cooling liquid such as water and located outside the containment which encloses the circuit of the reactor, the installation also incorporates means for aspirating and discharging, arranged at least to aspirate the liquid from the reservoir and to discharge the said liquid into the said circuit, a first liquid conduit which connects the reservoir to the said means, a second liquid conduit leaving the same means and terminating in the circuit of the reactor, there being provided means to recover and to convey the said liquid and the containment water and arranged to recover the said liquid and the water from the reactor, in the event of a break in the circuit of the latter, in the lower part of the containment after the said liquid has at least passed into the reactor's circuit, and conduct the said liquid and water by non gravitational flow to the said means for aspirating and discharging the cooling liquid, there being provided a first pipe-line for transferring liquid and containment water, the said pipe-line connecting the said means for recovering and conducting the liquid and containment water to the above-mentioned first conduit and being located upstream of the means of aspiration and discharging, the installation also incorporating a second pipe-line for transferring the liquid and containment water, the second pipe-line connecting the above-mentioned second conduit downstream of the aspiration and discharge means to the said means for recovering and conducting the liquid and the containment water, there also being incorporated valves arranged for permitting or stopping the flow of the liquid and the water which pass through the said conduits and the said pipe-lines.

According to one embodiment of the invention, the above-mentioned aspiration and discharging means consists of a pump, and the above-mentioned means for recovering and conducting the liquid and the containment water consists of an ejector.

According to an advantageous embodiment of the invention, the installation incorporates, in the upper part of the containment, at least one spray manifold arranged to project cooling liquid to the interior of the said containment and over at least a large portion of the volume it occupies, the said manifold being supplied with cooling liquid by the above-mentioned pump, the installation also being provided with a pipe-line which connects the second conduit, downstream of the pump, to the spray manifold.

According to an especially advantageous embodiment of the invention, the installation incorporates a hermetically sealed tank which is inserted in the first pipe-line connecting the ejector to the first conduit and whose axis is located in an essentially vertical plane, the said tank being provided with an opening let in at the top to which is connected the pipe-line originating from the ejector, and provided at the bottom with an opening to which is connected the pipe-line connecting the first conduit, the said tank additionally incorporating a vent-pipe leading to the containment and arranged to allow contaminated gases or vapors, which accumulate in the top part of the tank when the above-mentioned pipe-lines are filled with cooling liquid and water, to escape to the interior of the said containment.

According to a particularly advantageous embodiment of the invention, the installation incorporates a third conduit which, downstream of the pump, connects the second conduit to the reservoir, the installation also incorporating a valve which is normally closed when the installation is in use, the valve being associated with the said third conduit, and being arranged, in particular, to enable the functioning of the pump to be verified or to fill the reservoir when the latter is empty.

BRIEF DESCRIPTION OF THE DRAWINGS

Other details and special features of the invention will become evident from the description of the appended schematic drawing which represents, by way of non-limiting example, a particular embodiment of the invention.

DETAILED DESCRIPTION OF THE INVENTION

The safety installation constructed in accordance with the present invention and illustrated by the single appended figure incorporates a reservoir 1 for storing a cooling liquid 2 such as water, a pump 3, a conduit 4 which connects the reservoir 1 to the pump 3 and a conduit 5 which leaves the pump 3 and terminates in the water reactor circuit (not shown) of a power station. The pump 3 makes it possible, in particular, to aspirate the cooling liquid 2 from the reservoir 1 and to discharge the said liquid, or part of it, via the conduits 4 and 5, into the circuit of the reactor. As is the case with the pump 3, the reservoir 1 is located outside the sealed containment 6 which encloses the reactor circuit. A spraying manifold 7 is located in the upper part of the containment 6. It consists of one or more distributing tubes 16 equipped with regularly spaced spray nozzles 17. The said manifold is designed to project part of the cooling liquid 2 of reservoir 1 into the interior of the containment over at least a large part of the volume occupied by the latter, the said manifold being supplied with cooling liquid by the pump 3, a pipe-line 8 connecting conduit 5 to the manifold, downstream of the said pump 3.

Not only does this double injection of water make it possible efficiently to cool the circuit of the reactor and thus prevent the latter from melting, but it also serves to reduce the pressure in the containment by reducing the temperature in the latter when a break occurs in the reactor's circuit.

In order to pass from the injection phase to the recirculation phase of the cooling liquid, the installation is provided with an ejector 9, the said ejector making it possible to recover the cooling liquid falling into the sump 10 of the containment 6, the cooling liquid being mixed with water from the reactor in the event of a break or rupture in the circuit of the latter, and conduct this liquid mixture by non gravitational flow towards the pump 3 after the liquid 2 has passed into the circuit of the reactor. To this end, a pipe-line 11 connects the ejector 9 to the conduit 4 upstream of pump 3, and a pipe-line 12 connects the conduit 5, downstream of pump 3, to the ejector 9. A valve 13, which is incorporated in the pipe-line 12, and two valves 14 and 15 which are incorporated in the pipe-line 11, are arranged to permit or block the flow of cooling liquid and of the water coming from the circuit of the reactor.

In order to reactivate the ejector 9 and/or in order to raise the pressure of the liquid circulating in the pipe-lines 11, 12 associated with the ejector, to separate gases from the liquid the installation is provided with a hermetically sealed tank 18 whose axis is vertical. This tank 18, which is inserted in the pipe-line 11 between the valves 14 and 15, has, let into its upper part, an opening 19 to which is connected the part of the pipe-line 11 coming from the ejector 9, the lower part of the tank also being provided with an opening 20 to which is connected the part of the pipe-line 11 connected to the conduit 4. A vent pipe 21 leading to the containment 6 is set up to allow the gas or contaminated vapors, which accumulate in the top part of the tank when the ejector's pipe-lines are filled with cooling liquid and water, to escape to the interior of the containment. This tank 18 could, of course, be replaced by a normal pipe-line, that is, a pipe-line 11 could be provided without the tank 18. In this case, restarting of the ejector is effected via the principal reservoir 1.

Means 22, inserted in the conduit 5 downstream of the pump 3, are provided to contain a cooling fluid and to permit an exchange of heat between this cooling fluid and the cooling liquid and reactor water to be cooled, after the liquid, and, if such be the case, the reactor water, have passed through the reactor circuit. The installation is provided with a non-return valve 23 incorporated in the conduit 4, the valve allowing cooling liquid and water to pass towards the pump 3 and prevents them from passing in the reverse direction, that is, it prevents them from discharging into the reservoir 1.

In order, in particular, to verify that the pump 3 is functioning or to refill the reservoir 1 when the latter is empty, there is provided a conduit 24 which connects the conduit 5, downstream of the pump 2, to the reservoir 1, and also a valve 25 which is inserted in the said conduit 24 and which is normally closed when the installation is functioning.

In addition to the above-mentioned advantages, the safety cooling installation of the invention has the following advantages when compared with conventional installations:

(1) The ejector has no problem in pumping water loaded with debris such as pieces of concrete, heat-insulating rock wool, etc., with no risk of destruction.

(2) The ejector can function at a very low inlet pressure and withstands cavitation which could either result in a partial blockage of the inlet or in too low a water level in the sump.

(3) The ejector can easily be designed to withstand an earthquake.

(4) The ejector may be installed at the location most appropriate as far as operation and protection against possible missiles are concerned.

(5) In the event of the aspiration being blocked, unblocking may be effected by water pressure, by reversing the direction of flow.

(6) Since the size of the safeguarding pumps are conditiooed by the injection phase, the said pumps having a large margin during the recirculation phase, and a fraction of their flow can be used for driving the injectors.

Some installations are not equipped with a spray circuit within the containment and, on the other hand, where such a circuit exists, it is preferable to stop the spraying as soon as possible by closing the valve 26 in such a way as to limit the dispersion of contaminated water over the equipment and the structures.

Consequently, in the most probable case of a small rupture in the primary circuit, the recirculation flow-rate is very small when the spraying function is absent, which greatly reduces the rate at which the heat stored in the sump water is removed.

In addition, if so desired, the installation of the invention makes it possible to maintain a high rate of recirculation, thus ensuring rapid cooling of the sump water. This has a direct effect on the temperature of the containment and, consequently, on the pressure reigning within it.

The way in which the safety cooling installation of the invention functions may be easily understood by referring to the appended figure.

Subsequent to a break which leads to a depressurization of the reactor circuit and, as a result, to an increase of pressure in the containment 6, the one or more pumps 3 are put into service automatically and inject water under adequate pressure into the circuit of the reactor and, if such be the case, into the interior of the containment via the conduits 4, 5 and 8, the water being drawn from the storage reservoir 1. When the water level in the reservoir 1 reaches a predetermined lower limit, the ejector circuit is put manually or automatically into operation by progressively opening the valves 13 and 14. The ejector 9 takes back the sump water, that is, the injection water coming from the storage reservoir 1 and the functional water coming from the so-called reactor circuit. After a certain time, the ejector circuit is completely filled with water, the air containing the contaminating radioactive products having been expelled to the interior of the containment via the evacuation vent-pipe 21 belonging to the tank 18. The ejector 9 also has the effect of raising the pressure of the water circulating in the conduits, the pressure of the water leaving the tank 18 via the section of tube 11 being appreciably higher than that reigning in the conduit 4 on the reservoir side. The valve 15 is then opened, the pump 3 then being supplied with water coming from the sump 10 and the ejector 9. This water, which is radioactive, is not discharged into the reservoir 1 because the non-return valve 23 blocks the flow of water in this direction. The heat exchanger 22, which is cooled by a different water circuit, makes it possible rapidly to reduce the temperature of the water put back into circulation. The water is next re-injected into the reactor circuit via the conduit 5 and eventually to the interior of the containment via the conduit 8. Part of the sump water likewise passes through the pipe-line 12 and is conveyed towards the ejector 9. For better understanding the circuit associated with the ejector 9 is shown by the slightly thicker lines.

The return conduit 24 to the reservoir 1 is normally closed by the valve 25 and is only used to verify that the one or more pumps 3 are functioning, for filling the reservoir 1 or, if need be, for other purposes. In addition, in the event of a momentary stoppage of the circuit as, for example, during an interruption of the electric power supply, the ejector may be re-energized either by closing the valves 13, 14 and 15 and causing the injection to restart from the reservoir 1 and recommencing the above-defined sequence, or by using the reserve of water contained in the priming tank 18 insofar as the latter is filled.

It will be noted that the water coming from the so-called reactor circuit, which generally contains a certain amount of boric acid, and the cooling liquid coming from the storage reservoir, which likewise normally consists of water, and more particularly borated water, flow in the installation in a closed circuit. This prevents any possible contamination from occurring outside the containment and the above-mentioned installation.

It should be understood that the present invention is in no way limited to the embodiments described above, and modifications may be made without departing from the scope of the present patent.

We claim:

1. In a pressurized water nuclear power reactor, a safety cooling system comprising:

a reservoir for storing a cooling liquid, located outside the containment which encloses the circuit of the reactor; a pump, arranged at least to aspirate the liquid from the reservoir and to discharge said liquid into said circuit; a first liquid conduit which connects the reservoir to said pump; a second liquid conduit leaving said pump and terminating in the circuit of the reactor, an ejector to recover and to convey said liquid and the containment water, arranged to receoever said liquid and the water from the reactor in the event of a break in the circuit of the reactor, in the lower part of the containment after said liquid has at least passed into the reactor's circuit, and conduct said liquid and water by non gravitational flow to said pump; a first pipe-line for transferring liquid and containment water, connecting said ejector to said first conduit and being located upstream of the pump; valve means in said first pipe-line for permitting or stopping flow therethrough; a second pipe-line for transferring the liquid and containment water, connecting said second conduit downstream of the said pump to said ejector, and valve means in said second pipe-line for permitting or stopping flow therethrough.

2. In the pressurized water nuclear power reactor as defined in claim 1, the improvement wherein in the upper part of the containment, there is provided at least one spray manifold arranged to project cooling liquid into the interior of the said containment and over at least a large part of the volume occupied by said containment, said manifold being supplied with cooling liquid by said pump, there also being provided a pipe-line which connects the second conduit, downstream of the pump, to the spray manifold.

3. In the pressurized water nuclear power reactor as defined in claim 1, the improvement wherein a hermetically sealed tank is incorporated in the first pipe-line connecting the pump to the first conduit, the axis of said tank being located in an essentially vertical plane the upper part of said tank being provided with an opening to which is connected the pipe-line coming from the ejector, and the lower part of the tank is provided with an opening to which is connected the pipe-line connected to the first conduit.

4. In the pressurized water nuclear power reactor as defined in claim 3, the improvement wherein said tank is provided with a vent pipe which leads into the containment and which is arranged to allow gas or contaminated vapors, which accummulate in the top part of the tank, when the said pipe-lines are filled with cooling liquid and water, to escape into the interior of said containment.

5. In the pressurized water nuclear power reactor as defined in claim 1, the improvement comprising means to contain a cooling fluid and to permit an exchange of heat between, on the one hand, the cooling liquid and the reactor water to be cooled after said liquid has at least passed into the reactor circuit, and, on the other hand, the cooling fluid.

6. In the pressurized water nuclear power reactor as defined in claim 1, the improvement comprising a non-return valve associated with the first conduit connecting the reservoir to the pump and arranged to allow the cooling liquid and water to pass to the pump and to prevent passage thereof in the opposite direction.

7. In the pressurized water nuclear power reactor as defined in claim 1, the improvement wherein a third conduit is provided which connects the second conduit, downstream of the pump, to the reservoir, and a valve is provided in said third conduit, said valve being normally closed while the safety cooling system is in use, said valve being arranged to enable the functioning of the pump to be checked or to fill the reservoir when the latter is empty.

8. In the pressurized water nuclear power reactor as defined in claim 1, the improvement wherein the cooling liquid and water coming from the reactor circulate in the safety cooling system in a closed circuit.

9. In the pressurized water nuclear power reactor as defined in claim 1, the improvement wherein said cooling liquid is water.

* * * * *